Aug. 4, 1936. G. I. BARCLAY Re. 20,054
WINDOW CONSTRUCTION
Original Filed March 18, 1929 3 Sheets-Sheet 1
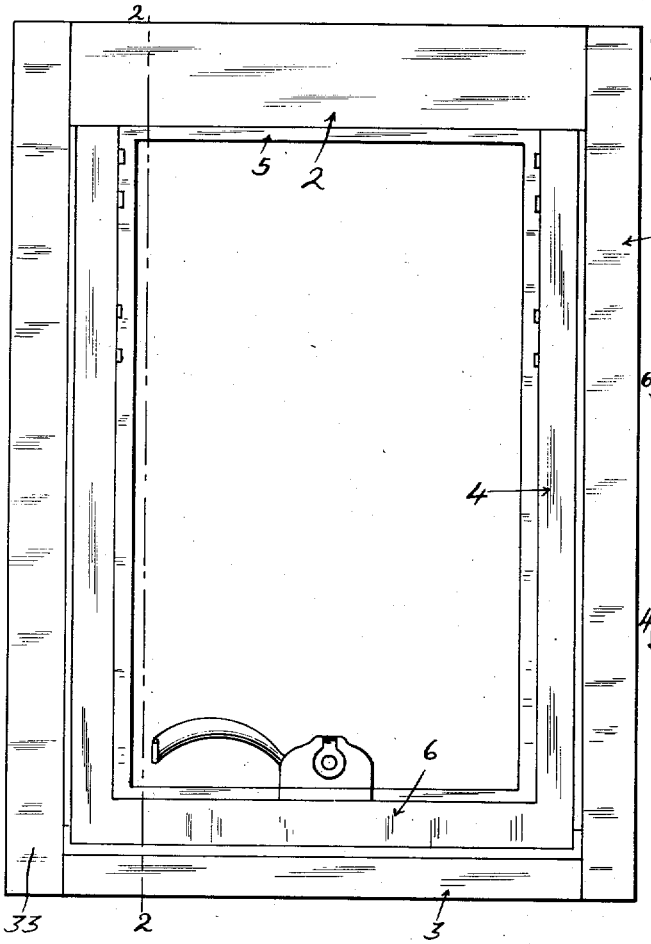
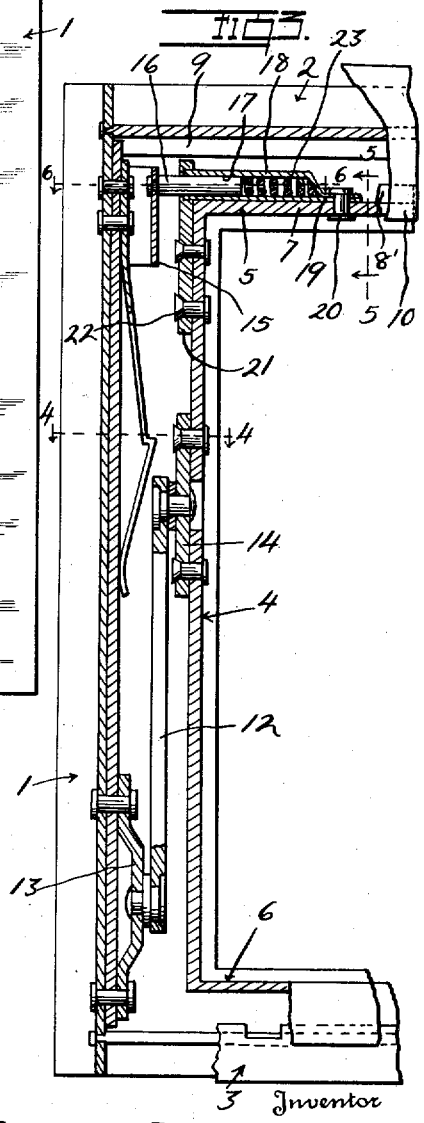
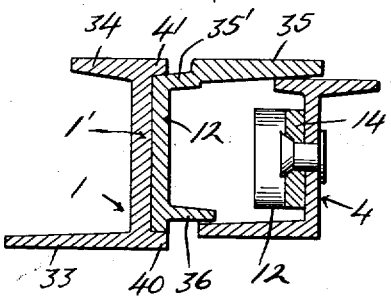
Inventor
Gustaf Ivar Barclay
By Whittemore, Hulbert & Whittemore & Belknap
Attorneys Aug. 4, 1936. G. I. BARCLAY Re. 20,054
WINDOW CONSTRUCTION
Original Filed March 18, 1929 3 Sheets-Sheet 2
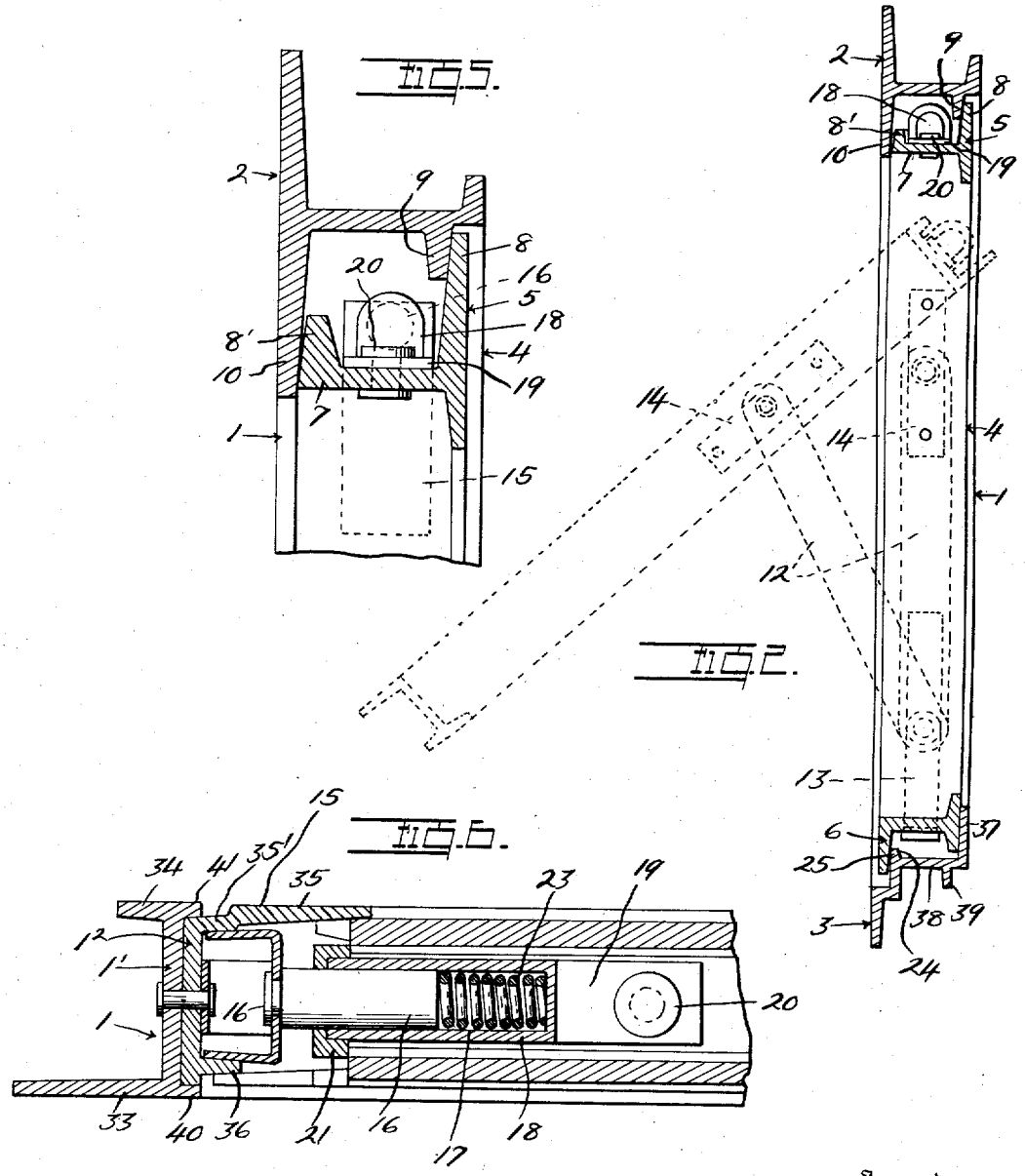
Inventor
Gustaf Ivar Barclay
By Whittemore, Hulbert & Whittemore & Belknap
Attorneys Aug. 4, 1936. G. I. BARCLAY Re. 20,054

WINDOW CONSTRUCTION

Original Filed March 18, 1929 3 Sheets-Sheet 3

Inventor
Gustaf Ivar Barclay

By Whittemore, Hulbert & Whittemore & Belknap
Attorneys

Reissued Aug. 4, 1936 Re. 20,054

UNITED STATES PATENT OFFICE 20,054

WINDOW CONSTRUCTION

Gustaf Ivar Barclay, Niles, Mich., assignor to Detroit Steel Products Company, Detroit, Mich., a corporation of Michigan Original No. 1,822,004, dated September 8, 1931, Serial No. 348,073, March 18, 1929. Application for reissue September 8, 1933, Serial No. 688,690

9 Claims. (Cl. 189—67)

The invention relates to window constructions and is particularly applicable to the swinging ventilator type. One of the objects of the invention is to form the window construction so that it will have a tight joint between the ventilator and the frame. Other objects are to construct the parts to provide for wedge engagement between the ventilator rail which is movable longitudinally of the frame and the frame member with which this rail comes into engagement; and to so construct the means for guiding the ventilator rail that the pivot about which the ventilator swings is beyond the ventilator rail and in substantial alignment transversely of the ventilator with the surface of the rail having the wedge engagement. Further objects are to provide an improved construction of frame which can be readily made to take care of either outwardly or inwardly swinging ventilators or both; to provide an improved construction of frame jamb having as a part thereof a weathering bar or strip; and to provide an improved construction of means for guiding the ventilator whereby provision is made for manufacturing inaccuracies and wear and at the same time rattling is avoided.

With these as well as other objects in view, the invention resides in the novel features of construction and combinations and arrangements of parts, as more fully hereinafter set forth.

In the drawings:

Figure 1 is an outside elevation of a window construction embodying my invention;

Figure 2 is an enlarged cross section on the line 2—2 of Figure 1;

Figure 3 is an enlarged front elevation broken away of a portion of the window construction;

Figure 7:
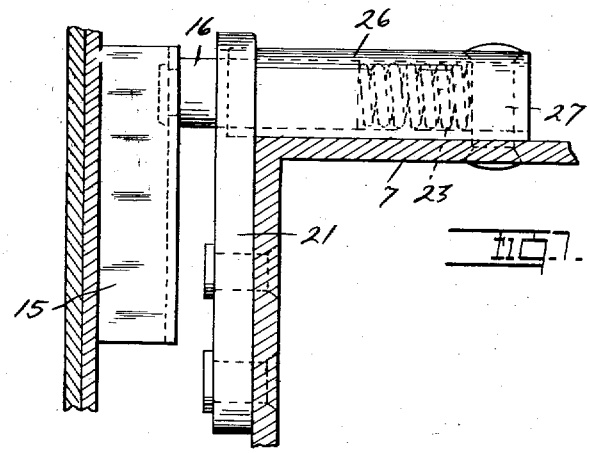
Figure 8:
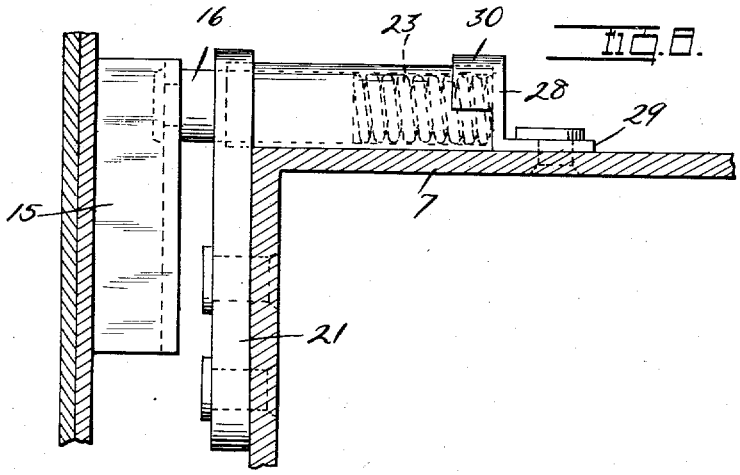
Figure 9:
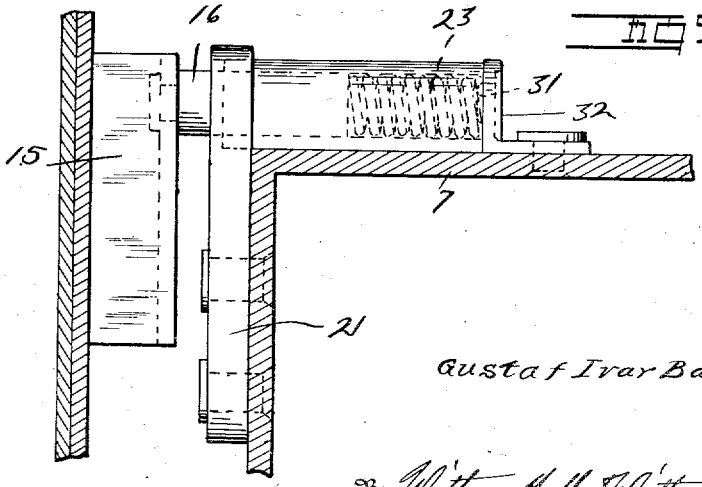

Figures 4, 5 and 6 are cross sections, respectively, on the lines 4—4, 5—5 and 6—6 of Figure 3;

Figures 7, 8 and 9 are views showing a portion of Figure 3 with modified guides.

The frame of the window construction has the jambs 1 and the top and bottom cross members 2 and 3 between these jambs. The ventilator has sash members in the nature of the jambs 4 and the top and bottom rails 5 and 6, respectively. The ventilator, as shown, is adapted to swing outwardly and its top rail 5 is movable longitudinally of the frame and more particularly its jambs 1. This top rail has the web 7 and the upwardly extending long and short flanges 8 and 8′, which are adapted to contact with and lie inside the depending short and long flanges 9 and 10, respectively, of the top cross member 2 when the ventilator is in closed position. The bottom rail 6 and the jambs 4 have the same arrangement of web and long and short flanges as the top rail 5, but their short flanges are located inwardly instead of outwardly of the long flanges as in the top rail.

The jambs 1 of the frame are each made of component jamb bars 1′ and component weathering bars or strips $1^2$ which are channel shaped and the webs of which contact and are suitably rigidly secured together to form a unit. Each jamb bar has the outer long flange 33 and the inner short flange 34 and each weathering bar or strip has the inner long flange 35 and the outer short flange 36, the inner face of the flange 35 being flush with that of the flange 34 and the outer face of the flange 36 being offset inwardly from that of the flange 33. The outer faces of the flanges 35 and 36 of each weathering bar or strip are engageable respectively by the short and long flanges of the jambs 4 of the ventilator. The bottom cross member 3 of the frame has the upwardly extending long flange 37 at the inner edge of its web 38 and the upwardly extending short flange 24 at the outer edge of the web 38, the outer faces of these flanges being engageable with the short and long flanges respectively of the bottom rail 6 of the ventilator. The outer faces of the flanges 37 and 24 register or are in alignment with the inside faces of the flanges 35 and 36 respectively of the jambs. The bottom cross member 3 further has the depending inner short and outer long flanges 39 and 11, respectively, which are offset outwardly with respect to the flanges 37 and 24 respectively and the inner faces of which are in alignment with those of the flanges 9 and 10 respectively of the top cross member 2. The jambs 1 and, more particularly, the jamb bars 1′ and the top and bottom cross members 2 and 3 respectively of the frame are fixedly secured together with their inner and outer faces in spaced parallel planes, the weathering bars or strips $1^2$ having their ends abutting the cross members. The jambs 4 and the top and bottom rails 5 and 6 respectively of the ventilator are fixedly secured together with their inner and outer faces in spaced parallel planes, the distance between which is less than that between the planes of the frame faces. As a result, both the frame and ventilator may be more readily joined from an assembly point of view and their inner and outer faces more economically finished because of the absence of any lateral projections on these faces. Also, the inside face at the frame assumes a position which is parallel with the inside face of the ventilator, regardless of type, presenting, in effect, a uniformly flush appearance from both the inside and outside irrespective of whether the ventilator is of the inswung or outswung type. By reason of the construction of the bottom cross member 3 of the frame, it may be used also as a top cross member for engagement with a second ventilator, which latter may be swung either outwardly or inwardly. In the event the member 3 is employed as the top cross member in the manner indicated above, the flange 39 instead of performing its usual function of engaging the building construction, serves the purpose of the drip usually employed at the top of a ventilator. Furthermore, the construction of the jambs 1 is such that the weathering bars or strips 1² may be secured to the jamb bars in the position shown or in reverse position, so that the jambs may be readily made to accommodate a ventilator which swings either outwardly or inwardly.

For weatherproofing and concealing the joint between each jamb bar 1' and its weathering bar or strip 1², each jamb bar is formed with the flanges 40 and 41 at the edges of its web and in alignment with but extending in an opposite direction from the flanges 33 and 34 respectively so that these flanges 40 and 41 embrace the web of the component weathering bar in such a manner that it automatically locates the correct position of said weathering bar irrespective of whether the latter is secured to the jamb bar in the position shown in Figure 6 or in the reverse position. The flanges 40 and 41 also render the joints between the component frame parts less obscure, since by reason of this construction, the ends of the joints face inwardly toward the center of the window. In this connection, attention is called to the fact that the joints between the outside flanges 40 and the adjacent edge of the weathering strip is further obscured in the closed position of the ventilator by the proximity of the edges of the weathering flanges on the ventilator as clearly shown in Figure 6. With reference to the inner side of the window, it will be noted from the above figure that the joints previously referred to between the bars at this latter side of the window, are further obscured by the offset portion 35' of the weathering strip. Moreover, by joining the component parts of the frame bar 1 in the manner discussed above at the outer side of the window, these joints are sheltered to a large extent from the weather so as to not only protect the joint itself, but also prevent any leakage through the window.

For the purpose of permitting the removal of any moisture collecting in the bottom cross member 3 of the frame and at the same time to assist in securing a better seal between the bottom rail 6 of the ventilator and this bottom cross member, the short upwardly extending flange 24 of the bottom cross member, which flange is adapted to be abutted by the long flange of the bottom rail, is formed with the transverse drain openings 25 having downwardly and outwardly inclined bases leading from the upper face of the web of the bottom cross member. These drain openings are covered and concealed by the long flange of the bottom rail when the ventilator is in closed position.

As shown particularly in Figure 2, the ventilator swings outwardly from the bottom and its top rail 5 slides downwardly and swings outwardly at the same time. In this connection, it is to be noted that the short flange 8' of the top rail is beveled in predetermined relation to the pivot of the ventilator in such a manner as to permit an increasingly greater clearance to be had when the ventilator is moved downward from its normal closed position and also to provide a wedging engagement with the cooperating flange 10 on the cross member 2 during the final closing movement of the ventilator in order to insure a weatherproof joint irrespective of slight inequalities in the contacting surfaces. In order to obtain efficient weatherproof joints between the remaining portions of the ventilator and frame, the long flanges of the bottom rail 6 and jambs 4 of the ventilator overlap the flanges 24 of the bottom cross member 3 and the flanges 36 of the weathering strip 1². In the present instance, the aforesaid joints are protected as well as obscured by laterally offsetting the flange 11 of the bottom cross member 3 and the flanges 33 and 40 of the jambs 1 in the manner clearly shown in the drawings.

12 are balance arms which are adapted to be located between the jambs of the ventilator and the frame when the ventilator is in closed position. The lower ends of these balance arms are pivotally connected to the clips 13 secured to the jambs 1 while the upper ends of these balance arms are pivotally connected to the plates 14, which are secured to the jambs 4.

For guiding the top rail 5, I have provided means at its opposite ends for slidably engaging the jambs 1 and more particularly the weathering bars or strips 1² of the frame. Both means are alike and therefore but one will be described. In detail, 15 is a channel-shaped shoe formed preferably of resilient material and having its flanges preferably converging inwardly from its base and slidably engaging in a correspondingly shaped channel formed by the inside surfaces of the flanges 35 and 36 of the component weathering bar or strip 1² in which the inner face of the flange 36 and the outer face of the flange portion 35' diverge with respect to each other and away from the web. As shown particularly in Figure 6, the above construction is such as to provide a frictional contact between the shoe and adjacent diverging faces of the flanges 35 and 36, and, in the present instance, proper engagement is insured by providing a clearance between the edges of the shoe flanges and the weathering bar. With this arrangement, it will be apparent that the ventilator is accurately centered within the window opening irrespective of manufacturing inaccuracies, and any tendency of the ventilator to rattle within its frame due to wear is eliminated.

The web of this shoe is rigidly secured to the pin 16, which extends transversely thereof and fits within the cylindrical portion 17 of the tube 18. This tube has the flattened inner end portion 19 through which extends suitable means such as the rivet 20 for securing the tube to the web 7 of the top rail, the tube extending longitudinally of and in contact with the web. 21 is a bar secured to the web of the jamb 4 by suitable means such as the rivets 22, this bar extending upwardly above the web 7 of the top rail and having an opening therethrough for receiving the outer end of the tube 18 and allowing the cylindrical portion of the tube to rotate, if necessary, by means of the vertical and horizontal ventilator bars or the ventilator jambs and rails being out of plane slightly in relation to each other. Clearance is preferably provided in the holes for receiving the rivets 22 so that the bar may be readily adjusted to properly align the tube 18 with the ventilator. The advantage gained is apparent, since it provides for insuring proper engagement of the complementary weathering surfaces irrespective of manufacturing inaccuracies. 23 is a coil spring within the tube and abutting the pin and the closed inner end of the tube for yieldably forcing the pin outwardly to yieldably maintain the shoe in constant engagement with the weathering member.

In the modification shown in Figure 7, the tube 26 instead of being flattened at its inner end, remains cylindrical throughout its length and its inner end is secured to the web of the ventilator top rail by the long rivet 27. The remainder of the construction is the same as that previously described.

The modification shown in Figure 8 differs from that of Figure 7 by substituting for the rivet 27 the bracket 28, which has the foot flange 29 riveted to the web of the ventilator top rail and the semicircular flange 30 partially encircling the inner end of the tube.

The modification in Figure 9 differs from that of Figure 8 in providing the boss 31 upon the bracket 32 and extending into the inner end of the tube.

From the above description, it will be readily seen that I have provided an improved construction of window having a frame so constructed that it may be readily made to take care of outwardly or inwardly swinging ventilators or both; that I have provided an improved construction of window frame jamb having as a part thereof a weathering bar or strip which can be secured in reverse positions to the jamb bar to take care of either outwardly or inwardly swinging ventilators; and that I have provided an improved construction of window in which the rail of the swinging ventilator movable longitudinally of the window frame has wedge engagement with its respective member of the frame providing a tight and weatherproof joint between these parts and in which the frame is constructed to conceal and weatherproof the joints at the other sides of the window. It will also be seen that I have provided a construction for draining the moisture from the frame, so arranged that the drain openings are concealed when the ventilator is closed. It will furthermore be seen that the pivot for the ventilator is so located that it is concealed between the ventilator and the frame when the ventilator is closed and that it is in substantial alignment transversely of the ventilator with the ventilator surface having wedge engagement with the frame, thereby reducing to the minimum the angular movement of this ventilator surface and providing for its wedge engagement; and that the ventilator guiding means is yieldable to provide for wedge engagement and take care of manufacturing inaccuracies and wear and at the same time prevent rattling.

What I claim as my invention is:

1. In a window construction, the combination with a frame, of a swinging ventilator having jambs and a rail therebetween movable longitudinally of said frame, and means for guiding said rail including a shoe slidably engaging said frame, a transverse pin upon said shoe, a tubular member receiving said pin and engaging said rail, means for securing the inner end of said tubular member to said rail, and means upon one of said jambs for securing the outer end of said tubular member in place.

2. In a window construction, the combination with a frame, of a swinging ventilator having jambs and rails therebetween, one of said rails being movable longitudinaly of said frame, and means for guiding said longitudinally movable rail including a shoe slidably engaging said frame, a transverse pin upon said shoe, a tube receiving said pin, means for securing the inner end of said tube to said rail, and a bar adjustably secured to one of said jambs and formed with an opening to receive the outer end of said tube.

3. In a window construction, the combination of a frame, a ventilator adapted to move angularly and longitudinally of said frame, and means for connecting said ventilator to said frame, comprising a channel-shaped shoe pivotally connected to said ventilator and having converging flanges with their sides slidably engaging said frame.

4. In a window construction, the combination of a frame having opposed frame members, one of said frame members having channel-shaped portions with the flanges of the channel extending from the web toward the other of said frame members and diverging with respect to each other, a ventilator adapted to move angularly and longitudinally of said frame, and means for connecting said ventilator to said frame, comprising a resilient channel-shaped shoe pivotally connected to said ventilator and having its flanges extending outwardly from its web and converging with respect to each other, said second mentioned flanges slidably engaging said first mentioned flanges.

5. In a window construction, the combination of a frame having jambs and cross members between said jambs and a swinging ventilator mounted upon said frame, one of said cross members having spaced inner and outer upwardly extending flanges for engagement with said ventilator and spaced inner and outer downwardly extending flanges offset laterally outwardly from said first mentioned inner and outer flanges respectively.

6. In a window construction, the combination with a frame having jamb bars and a ventilator mounted in said frame for swinging movement relative thereto, of means on said frame for abutting the ventilator in the closed position of the latter comprising weathering strips forming component parts of the jambs and attachable to the latter in reverse positions to accommodate either outwardly or inwardly swinging ventilators.

7. In a window construction, the combination of a frame having jambs, a ventilator mounted within the frame for swinging movement relative thereto, flanges extending toward the ventilator from the inner and outer edges of the jambs, and weathering strips having portions secured to the jambs between said flanges in abutting relation thereto and having other portions for engaging the adjacent sides of the ventilator.

8. In a window construction, the combination of a frame defining an opening and having a substantially channel-shaped frame member with the flanges of the channel extending from the web thereof toward the opening, a ventilator mounted within the frame opening for movement angularly and longitudinally of said frame, and means for connecting said ventilator to the frame including a substantially channel-shaped shoe pivotally connected to the side of the ventilator adjacent the channel shaped frame member aforesaid and having the flanges thereof extending outwardly from its web into frictional engagement with the inner surfaces of the flanges on said frame member.

9. In a window construction, the combination with a frame having jamb bars and a ventilator mounted in said frame for swinging movement relative thereto, of flanges extending toward the ventilator from the inner and outer edges of the jambs and means on the frame for abutting the ventilator in the closed position of the latter comprising weathering strips having portions attachable in reverse positions to the jambs between the flanges on the latter in abutting relation to said flanges to accommodate either outwardly or inwardly swinging ventilators.

GUSTAF IVAR BARCLAY.